Sept. 18, 1945.     C. O. COZZENS     2,384,815
OPHTHALMIC MOUNTING
Filed June 30, 1941     2 Sheets-Sheet 2
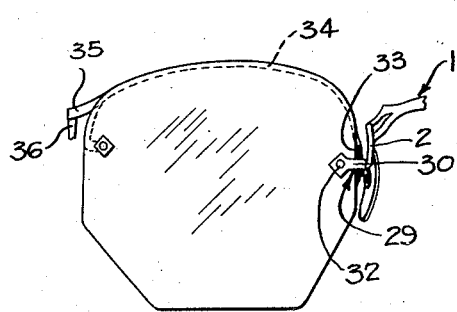
Fig. VIII
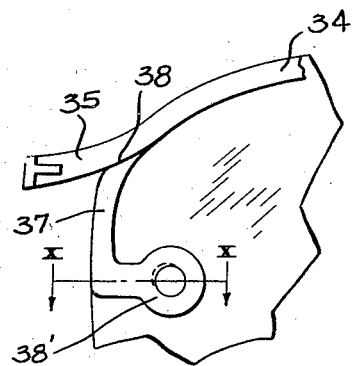
Fig. IX
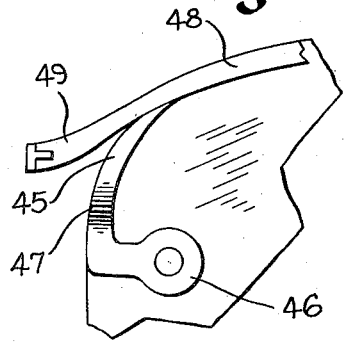
Fig. XII
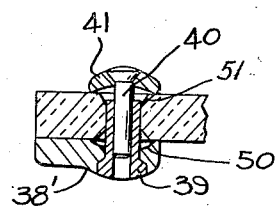
Fig. X
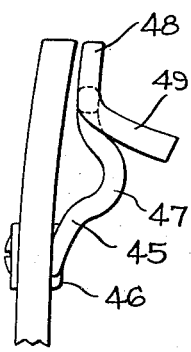
Fig. XIII
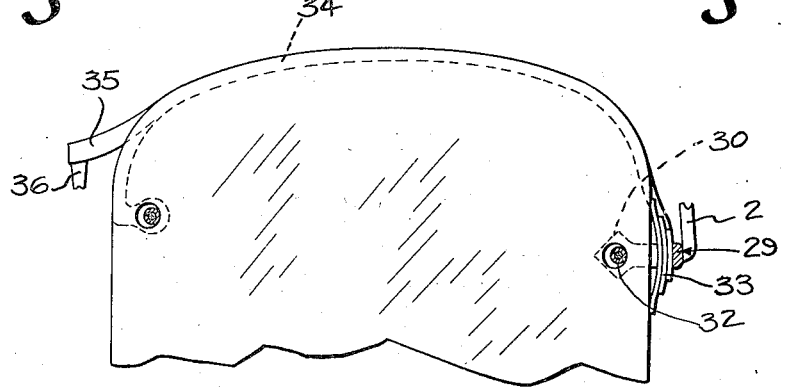
Fig. XI
INVENTOR.
CHARLES O. COZZENS
BY
ATTORNEY.

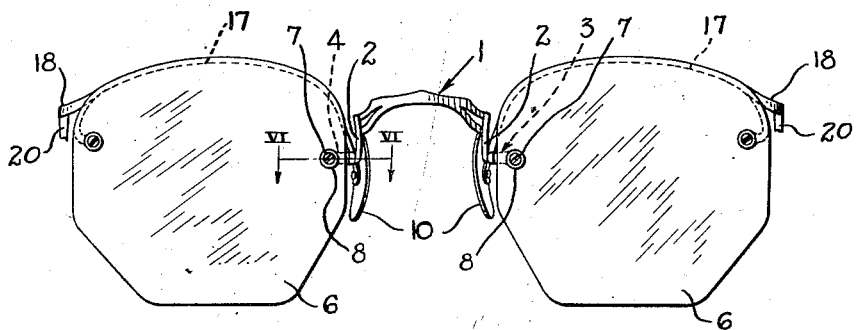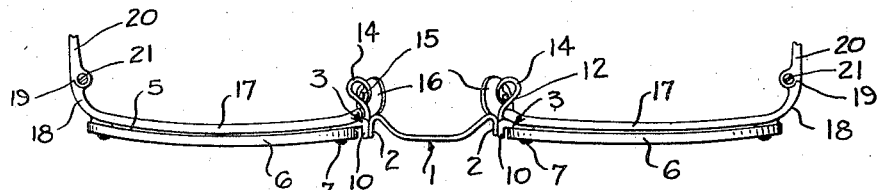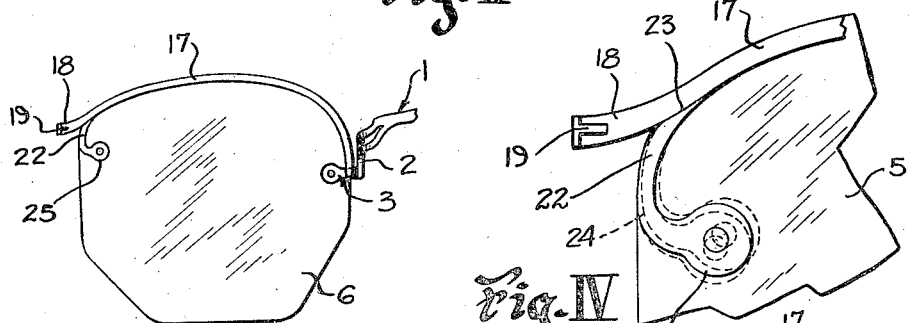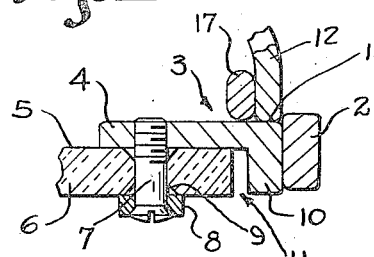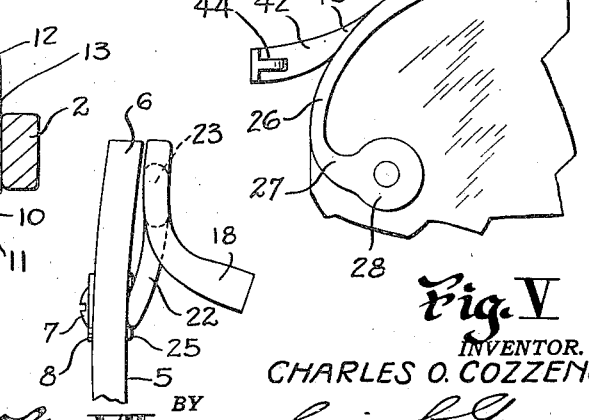

Patented Sept. 18, 1945

2,384,815

UNITED STATES PATENT OFFICE 2,384,815

OPHTHALMIC MOUNTING

Charles O. Cozzens, Southbridge, Mass., assignor to American Optical Company, Southbridge, Mass., a voluntary association of Massachusetts Application June 30, 1941, Serial No. 400,414

7 Claims. (Cl. 88—41)

This invention relates to improvements in ophthalmic mountings and has particular reference to a novel lens supporting structure.

One of the principal objects of the invention is to provide a supporting structure for an ophthalmic mounting with said structure comprising a bridge member and bar-like members adapted to follow the upper contour edges of a pair of lenses, said structure having, on the temporal portions thereof, temple connecting means and lens connecting means adjustable with respect to said temple connecting means.

Another object of the invention is to provide a semi-frame type lens supporting structure with adjustable arm portions adapted to follow the upper contour edges of the lenses and each having lens connection means adjacent the opposed ends thereof to which the lenses may be attached and with each of said arms having temple supports so located that the said arms will have a portion or section of the temporal sides of said lenses independently adjustable with respect to the main body portion of the arm portions and with respect to the temple supports.

Another object of the invention is to provide a semi-frame type lens supporting structure with adjustable arm portions adapted to follow the upper contour edges of the lenses and each having lens connection means adjacent the opposed ends thereof to which the lenses may be attached by connection means extending through openings in the lenses and with each of said arms having outwardly and rearwardly extending temple supports located a considerable distance above the lens connection means on the temporal sides of the lenses whereby the said arms will have a portion or section on said temporal sides of said lenses adjustable independently of the adjustment of the main body portion of the arm members which are shaped to follow the upper contour edges of the lenses and independently of the outwardly and rearwardly extending temple supports which may be independently adjusted to fit the facial characteristics of the wearer.

Another object is to provide a suspension type lens supporting structure, having separately adjustable sections which may be readily fitted to lenses of different contour shapes and sizes particularly lenses slightly under or over size and which may be adjusted to compensate for irregularities of drill positions in the connection openings of the lenses thereby eliminating the usual exactness of location of drill position of the openings in the lenses, sizing of lenses, etc., and greatly facilitating the fabrication of mountings of this character.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims.

I, therefore, do not wish to be limited to the exact details shown and described as the preferred forms only have been given by way of illustration.

Referring to the drawings:

Fig. I is a front elevation of an ophthalmic mounting having the features of my invention embodied therein;

Fig. II is a top plan view of the mounting shown in Fig. I;

Fig. III is a partial rear view of the mounting shown in Figs. I and II, certain of the parts thereof being broken away;

Fig. IV is an enlarged fragmentary view showing the adjustable lens supporting arms in connected relation with the temple and lens supporting arms in connected relation with the temple and lens supporting bar;

Fig. V is an enlarged fragmentary view of a modified form of the invention;

Fig. VI is an enlarged sectional view of parts of the invention as taken on line VI—VI of Fig. I;

Fig. VII is a side view of Fig. IV;

Fig. VIII is a partial rear view of a modified form of the invention;

Fig. IX is an enlarged fragmentary view of a modified form of the invention;

Fig. X is an enlarged sectional view of parts of the invention as taken on line X—X of Fig. IX;

Fig. XI is an enlarged view of Fig. VIII with certain parts broken away.

Fig. XII is a view generally similar to Fig. XI illustrating a modified form of the invention; and Fig. XIII is a side view of Fig. XII.

In the past, with ophthalmic mountings of this kind many difficulties were encountered, especially when assembling the lenses, as any inaccuracies as to drill positions of the connection holes in the lenses could not be compensated for without throwing other related parts out of adjustment and position; similar difficulties were encountered when the lenses were slightly larger or smaller than the required size. In rimless mountings where no connecting bar was used inaccuracies in drill positions caused the lenses to be subjected to more strain and therefore they were more easily broken. One of the various objects of this invention is to provide a construction wherein the above mentioned difficulties, as well as many others, are successfully and efficiently overcome and a rigid, substantially strain free and durable lens supporting structure is provided.

Referring more particularly to the drawings wherein like characters of reference designate like parts throughout the several views the invention resides primarily in the provision of a lens supporting structure comprising a bridge 1 having depending side portions 2 connected adjacent the lower ends thereof to lens connection means 3. The lens connection means 3 comprises a perforated ear 4 shaped to overlie the inner surface 5 of the lens 6 adjacent the nasal side of the lens. The perforation in the ear 4 is preferably threaded to receive a connection screw 7. The said screw 7 is provided with a washer 8 with a diameter sufficient to overlie the adjacent contour of the connection opening 9 in the lens (Fig. VI). The washer 8 may, if desired, be of cushioning material such as rubber to aid in avoiding strain in the lenses. The depending side portions 2 of the bridge are secured adjacent the lower ends thereof to an angled portion 10 which is shaped to overlie the edge of the lens but is spaced from the adjacent edge of the lens, as illustrated at 11, to provide clearance for lenses which are slightly oversized and also to compensate for variations in the drilled hole position of the connection opening 9 in the lens.

Suitable adjustable nose pad supporting arms 12 are secured to the lens straps 3 as by soldering or other suitable means as illustrated at 13. The said arms 12 extend rearwardly to intermediate adjustable loop portions 14 which turn rearwardly and downwardly to pivotal connections 15 by means of which the nose bearing pads 16 are pivotally attached to said arms.

Relatively long and slender adjustable bar-like members 17 are secured adjacent the nasal ends thereof to the nose pad supporting arm 12 or to the rear of the lens strap or partially to both as illustrated in Fig. VI, or if desired, either partially or completely to the bridge member 1. It is to be understood that the said nose pad supporting arms may be secured to the ends of the depending side portions 2 as desired or may be formed as an integral part thereof turning rearwardly from a point adjacent the connection of the depending side portions 2 with the portions 10 of the lens straps. The arms 17 are shaped to progress upwardly and outwardly so as to follow substantially the shape of the upper contour edges of the lenses and are preferably located in the rear of said upper edges so as to be inconspicuous and substantially invisible when the mounting is viewed from the front. The said arms 17, as illustrated at Fig. III, progress outwardly to rearwardly extending adjustable temple supporting portions 18 having an end 19 to which the temples may be pivotally attached. In the construction illustrated in Fig. IV there is provided a depending portion 22 secured to the arm 17 adjacent the rearwardly extending temple supporting portion 18 as by soldering or the like, at point 23. Said depending portion is preferably of a smaller diameter than the diameter of the bar member 17 so as to provide ease of adjustment. This depending portion 22 extends downwardly and curves inwardly as illustrated at 24 and terminates in an enlarged perforated lens connection portion 25 adapted to engage the rear surface 5 of the lens.

It is to be understood that the depending portion 22 may be adjusted without disturbing either the arm 17 or the temple support portion 18.

In the modified construction shown in Fig. V, the bar-like members 17 progress outwardly to adjustable depending portions 26, which are tapered to provide ease in adjusting. This depending portion 26 extends downwardly and curves inwardly as illustrated at 27 and terminates in an enlarged perforated lens connection portion 28, adapted to engage the rear surface of the lens. Attached to the bar member 17 by solder or the like and extending outwardly and rearwardly is a suitable endpiece 42 to which a temple member may be pivotally attached.

In the modified construction shown in Figs. VIII, IX, X and XI inclusive, which comprises a bridge 1 having depending side portions 2 connected adjacent the lower ends thereof to lens straps 29, said straps have two perforated ears 30 shaped to overlie the front and rear surfaces of the lens, the perforated ears being adapted to receive a screw, pin and tube or any suitable connecting means 32.

Spring members 33 are attached between the ears 30 and are adapted to lie against the edge of the lens thereby constantly urging the connecting means 32 against the wall of the drilled hole in the lens.

Relatively long and slender adjustable bar-like members 34 are each secured adjacent the nasal end thereof to the rear of a strap ear 30 and are shaped to progress upwardly and outwardly so as to follow substantially the shape of the upper contour edge of the lens and are preferably located in the rear of said lens, the bar members 34 progressing outwardly to rearwardly extending portions 35 to which temples 36 are pivotally connected. In the construction shown in Fig. IX there is provided a depending portion 37 secured to the bar-like member 34 adjacent the rearwardly extending temple support by soldering or the like, as illustrated at 38. Said depending portion is preferably smaller in cross section than the bar-like member 34 for ease in adjusting. This depending portion 37 extends downwardly and follows the contour edge of the lens to a point adjacent the drill hole in the lens where it bends inwardly substantially at right angles to the depending portion 37, and terminates in an enlarged perforated lens connection portion 38' adapted to engage the rear surface of the lens, the perforation in the ear 38' being adapted to receive a tube member 39 which receives a pin member 40 provided with a washer 41 having a diameter sufficient to permit the washer to overlie the peripheral edge of the opening 51 in the lens. The pin and tube are connected as by soldering or the like.

It is particularly pointed out that the major part of the depending portions 22, 26 or 37, as the case may be, is shaped to follow substantially the adjacent portion of the contour of the lens and thence turn inwardly to the lens connection end.

In the various different constructions, the portions 22, 26 or 37, as the case may be, extend downwardly substantially in the direction of the plane of the lenses. The said lens connection ends may be attached to the lenses by any suitable means known in the art. In the construction, illustrated in Fig. V, the temple endpiece 42 has an end 43 which is tapered so as to blend with the contour of the bar member 17 and extends outwardly from said taper in a downward and rearward sweeping curve to a temple hinge connection 44. In all of the constructions described above a resilient type lens strap connection, such as illustrated in Fig. XI, might be used. In assembling the lenses with the supporting structure the nasal lens strap is first secured to the lens. The bar-like members 17 are then adjusted to follow substantially the upper contour shape of the lenses and the depending portions 22, 36 or 37, as the case may be, are adjusted to align the opening in the connection end thereof with the opening in the lens and to simultaneously position the bar-like members 17 or 34 adjacent the contour edges of the lenses. This is accomplished by moving the connection end 25 or 28, as the case may be, inwardly towards the surface of the lens or outwardly depending upon the desired position of the bar-like portions 17 relative to the adjacent contour of the lens and by simultaneously adjusting the end upwardly or downwardly, as illustrated diagrammatically by dash lines in Fig. IV, to align the connection opening in said end with the opening in the lens. Following this particular adjustment the temple supporting portions 18 or 42, as the case may be, are adjusted to alter the distance between the temple connections to the requirements of the particular individual for whom the mounting is being formed and may also be bent upwardly or downwardly to change the angle of the temples when extended relative to the plane of the lenses. This latter adjustment may be accomplished independently of the previous adjustment of the bar-like member 17.

In all of the constructions, it is particularly stressed that the bar-like members 17 or 34, as the case may be, terminates on the temporal sides thereof in a bifurcated portion, one branch of which constitutes the temple connection and the other a depending adjustable lens connection supporting member.

In the construction, illustrated in Figs. XII and XIII, the depending portions 45 on which the lens connection ends 46 are carried while shaped to follow substantially the shape of the adjacent contour edge of the lens, are provided intermediate the ends thereof with an adjustable loop portion 47 which extends rearwardly in a direction substantially normal to the plane of the lens. This is to permit the lengthening or shortening of the depending portion and also enables the connection end 46 thereof to have a relatively wide range of adjustment. Although the depending portions are illustrated as being formed separately from the bar-like portions 48 with the temple supporting ends 49 thereof shown as an integral part of the bar-like members 48, it is to be understood that the portions 45 may be formed integral with the members 48 and the temple end 49 may be formed separately and joined thereto substantially as shown in Fig. V.

While the washer 8 is described as being formed of cushioning material, such as rubber, it is to be understood that it may be formed of fiber, Celluloid or any other desirable cushioning material. If desired, said washer may be formed of metal in which instance it would be preferable to have the inner surface thereof cupped in a manner simulating the washer 41 of Fig. X. It is also to be understood that the washer 41 may be formed of rigid or cushioning material. In instances when the temple supporting ends 18, 35, 42 or 49, as the case may be, are formed separately the ends thereof which are to be attached to the bar-like portions are tapered so as to have a pleasing blend with said bar-like portions with the surface thereof which is to be secured to the bar-like portions being shaped to a contour shape simulating the contour of the portion of the bar-like members to which said temple supports are to be attached. The attaching may be accomplished by soldering, welding or other suitable means. In instances, when the depending portions 26, 37 or 45 as the case may be are formed separate the said attachment ends thereof are shaped to and blended with the bar-like members by a gradually reducing taper. In all of the constructions described, it is particularly pointed out that, when the mounting is viewed from the front, the depending portions carrying the perforated lens connection ends all have the major portion thereof shaped substantially to the adjacent contour shape of the lens and when formed separate from the bar-like members are preferably secured to the under or lower surface of said bar-like members. It is to be understood that the bar-like members while being formed of material which may be adjusted, possess sufficient rigidity after adjustment to retain the adjusted position relative to the lens.

With the arrangement shown, the prior art required accuracy in locating the drill positions of the connection openings in the lens is greatly reduced as the various constructions described provide means for compensating for slight positional inaccuracies which might occur when forming said lens connection openings. The required prior art accuracy in edging the lens to accurate contour size and shape is also greatly reduced as means are provided for compensating for slightly oversized and undersized lenses.

If desired, as illustrated in Fig. XI, in order to relieve the lens from inherent supporting strain and to also relieve the lens from shock when accidentally struck, etc., the connection openings in the lens may be formed slightly larger in diameter than is usually required, in which instance, the resilient means, such as illustrated at 33, is used to constantly urge the side walls of the connection openings into engagement with the attaching means by which the lens supporting structure is secured to the lens and resiliently eliminates undue looseness of the lens during use. The associated parts of the lens supporting structure are so adjusted as to properly align with the contour edge of the lens when the said lens is resiliently held in position.

The connection ends 25, 28, 38' or 46, as the case may be, may have the inner surfaces thereof cupped as illustrated at 50 in Fig. X so as to reduce the bearing surface thereof on the lens. In this instance, it is preferably desirable that the connection ends be of a diameter considerably larger than the connection openings in the lens so that the annular contracting surface of said end with the lens resulting from the cupping of the inner surface thereof will engage the lens at a distance spaced outwardly from the contour edge of the connection opening in a manner similar to the cupped washer 41. This is to relieve pressure strain on the lens. If desired, a suitable cushioning washer or the like might be used between said connection ends and the lens.

From the foregoing description it will be seen that the applicant has provided simple, efficient and economical means of accomplishing all the objects and advantages of the invention.

Having described my invention, I claim:

1. A lens supporting structure for the lenses of an ophthalmic mounting having connection openings in the nasal and temporal sides thereof, comprising a bridge member, relatively long and slender bar-like temple supports progressing outwardly from adjacent the bridge member and adapted to follow the upper contour edges of the lenses when related therewith, lens holding means adjacent said bridge having at least one perforated ear adapted to be connected to the lens through lens connection means extending through said perforated ear and the connection opening in the nasal side of said lens, each of said bar-like temple supports having a bifurcated portion adjacent the temporal end thereof with one branch of said bifurcation being relatively long and curving outwardly and rearwardly to a pivotal temple connection and the other extending downwardly substantially in the plane of the rear surface of the lens with the major portion thereof shaped to follow substantially the adjacent contour shape of the lens and terminating in an inwardly deflected portion having a flared end, said flared end having a perforation therein being so restricted on its lens engaging side that said entire end lies to one side of the plane of the adjacent surface of the lens when said end is in secured relation with the lens, said perforation being alignable, through adjustment of said flared end in any desired direction while retaining said end substantially in the plane of the rear surface of the lens, with the connection opening in the temporal side of the lens and being adapted to be secured to said lens by connection means extending through said perforation and the connection opening in the temporal side of the lens.

2. A lens supporting structure for the lenses of an opththalmic mounting having connection openings in the nasal and temporal sides thereof, comprising a bridge member, relatively long and slender bar-like temple supports progressing outwardly from adjacent the bridge member and adapted to follow the upper contour edges of the lenses when related therewith, lens holding means adjacent said bridge having at least one perforated ear adapted to be connected to the lens through lens connection means extending through said perforated ear and the connection opening in the nasal side of said lens, each of said bar-like temple supports having a bifurcated portion adjacent the temporal end thereof with one branch of said bifurcation being relatively long and curving outwardly and rearwardly to a pivotal temple connection and the other extending downwardly substantially in the plane of the rear surface of the lens with the major portion thereof shaped to follow substantially the adjacent contour shape of the lens and terminating in an inwardly deflected portion having a flared end, said flared end having a perforation therein, said perforation being alignable, through adjustment of said flared end in any desired direction while retaining said end substantially in the plane of the rear surface of the lens, with the connection opening in the temporal side of the lens and being adapted to be secured to said lens by connection means extending through said perforation and the connection opening in the temporal side of the lens, said flared end having an uninterrupted inner surface substantially parallel with the adjacent rear surface of the lens.

3. An ophthalmic mounting comprising a pair of lenses having connection openings in the nasal and temporal sides thereof, a bridge member, relatively long and slender bar-like temple supports progressing outwardly from adjacent the bridge member and adapted to follow the upper contour edges of the lenses, lens holding means adjacent said bridge having at least one perforated ear connected to the lens through lens connection means extending through said perforated ear and the connection opening in the nasal side of said lens, each of said bar-like temple supports having a bifurcated portion adjacent the temporal end thereof with one branch of said bifurcation being relatively long and curving outwardly and rearwardly to a pivotal temple connection and the other extending downwardly substantially in the plane of the rear surface of the lens with the major portion thereof shaped to follow substantially the adjacent contour shape of the lens and terminating in an inwardly deflected portion having a flared end, said flared end having a perforation therein and lying entirely to one side of the plane of the adjacent surface of the lens, said perforation being alignable, through adjustment of said flared end in any desired direction while retaining said end substantially in the plane of the rear surface of the lens, with the connection opening in the temporal side of the lens and being secured to said lens by connection means extending through said perforation and the connection opening in the temporal side of the lens.

4. A lens supporting structure for the lenses of an ophthalmic mounting having connection openings in the nasal and temporal sides thereof, said supporting structure comprising a bridge member, relatively long and slender bar-like temple supports progressing outwardly from adjacent the bridge member and adapted to follow the upper contour edges of the lenses when related therewith, lens holding means adjacent said bridge having at least one ear member with a perforated portion adapted to be connected to the lens through lens connection means extending through the connection opening in the nasal side of the lens and into said perforated portion, each of said bar-like temple supports having a bifurcated portion adjacent the temporal end thereof with one branch of said bifurcation being relatively long and curving outwardly and rearwardly of the adjacent edge of the lens to a pivotal temple connection and the other branch of said bifurcation extending downwardly from said bar-like temple support from a point inwardly of the temporal end thereof and adjacent the contour edge of the lens and, when viewed from the front, following substantially the shape of the adjacent edge of the lens throughout the major length of said depending portion and terminating in an inwardly deflected portion extending from adjacent the edge of the lens and lying substantially in the plane of the rear surface of the lens throughout its length, said inwardly deflected portion terminating in a portion having a perforation therein, said perforated portion having an uninterrupted lens face engaging surface, with the perforation being alignable with the connection opening in the temporal side of the lens, through adjustment of said depending portion and said inwardly deflected portion and being adapted to be secured to said lens by connecting means extending through the connection opening in the temporal side of the lens and into the said perforated portion.

5. An ophthalmic mounting comprising a pair of lenses having connection openings in the nasal and temporal sides thereof, a bridge member, relatively long and slender bar-like temple supports progressing outwardly from adjacent the bridge member and following the upper contour edges of the respective lenses, lens holding means adjacent the opposed sides of the bridge member each having at least one ear member with a perforated portion adapted to be connected to the lenses through lens connection means extending through the connection openings in the nasal sides of the lenses and into said perforated portions, each of said bar-like temple supports having a bifurcated portion adjacent the temporal ends thereof with one of the branches of said bifurcation being relatively long and curving outwardly and rearwardly of the adjacent edges of the lenses to pivotal temple connections and the other branches of said bifurcation extending downwardly from said bar-like temple supports from points inwardly of the temporal ends thereof and adjacent the contour edges of the lenses and, when viewed from the front, following substantially the adjacent edges of the lenses throughout the major length of said depending portions and terminating in inwardly deflected portions extending from adjacent the edges of the lenses and lying substantially in the plane of the rear surfaces of the lenses throughout their length, said inwardly deflected portions each terminating in a portion having a perforation therein, said perforated portions each having an uninterrupted lens engaging surface, with the perforations being alignable with the connection openings in the temporal sides of the lenses, through adjustment of said depending portions and said inwardly deflected portions and being secured to said lenses by connecting means extending through the connection openings in the temporal sides of the lenses and into the said perforated portions.

6. A lens supporting structure for the lenses of an ophthalmic mounting having connection openings in the nasal and temporal sides thereof, said supporting structure comprising a bridge member, relatively long and slender bar-like temple supports progressing outwardly from adjacent the bridge member and adapted to follow the upper contour edges of the lenses when related therewith, lens holding means adjacent said bridge having at least one ear member with a perforated portion adapted to be connected to the lens through lens connection means extending through the connection opening in the nasal side of the lens and into said perforated portion, each of said bar-like temple supports having a bifurcated portion adjacent the temporal end thereof with one branch of said bifurcation being relatively long and curving outwardly and rearwardly of the adjacent edge of the lens to a pivotal temple connection and the other branch of said bifurcation extending downwardly from said bar-like temple support from a point inwardly of the temporal end thereof and adjacent the contour edge of the lens and following substantially the shape of the adjacent edge of the lens throughout the major length of said depending portion, said depending portion, intermediate the ends thereof, being looped in a rearward direction when viewed from the side, and terminating in an inwardly deflected portion extending from adjacent the edge of the lens and being substantially in the plane of the rear surface of the lens throughout its length, said inwardly deflected portion terminating in a portion having a perforation therein, said perforated portion having an uninterrupted lens face engaging surface with the perforation being alignable with the connection opening in the temporal side of the lens, through adjustment of said depending portion and said inwardly deflected portion and being adapted to be secured to said lens by connecting means extending through the connection opening in the temporal side of the lens and into the said perforated portion.

7. An ophthalmic mounting comprising a pair of lenses having connection openings in the nasal and temporal sides thereof, a bridge member, relatively long and slender bar-like temple supports progressing outwardly from adjacent the bridge member and following the upper contour edges of the respective lenses, lens holding means adjacent the opposed sides of the bridge member each having at least one ear member with a perforated portion adapted to be connected to the lenses through lens connection means extending through the connection openings in the nasal sides of the lenses and into said perforated portions, each of said bar-like temple supports having a bifurcated portion adjacent the temporal ends thereof with one of the branches of said bifurcation being relatively long and curving outwardly and rearwardly of the adjacent edges of the lenses to pivotal temple connections and the other branches of said bifurcation extending downwardly from said bar-like temple supports from points inwardly of the temporal ends thereof and adjacent the contour edges of the lenses and following substantially the adjacent edges of the lenses throughout the major length of said depending portions, said depending portion, intermediate the ends thereof, being looped in a rearward direction when viewed from the side, and terminating in inwardly deflected portions extending from adjacent the edges of the lenses and lying substantially in the plane of the rear surfaces of the lenses throughout their length, said inwardly deflected portions each terminating in a portion having a perforation therein, said perforated portions each having an uninterrupted lens engaging surface, with the perforations being alignable with the connection openings in the temporal sides of the lenses, through adjustment of said depending portions and said inwardly deflected portions and being secured to said lenses by connecting means extending through the connection openings in the temporal sides of the lenses and into the said perforated portions.

CHARLES O. COZZENS.